United States Patent Office

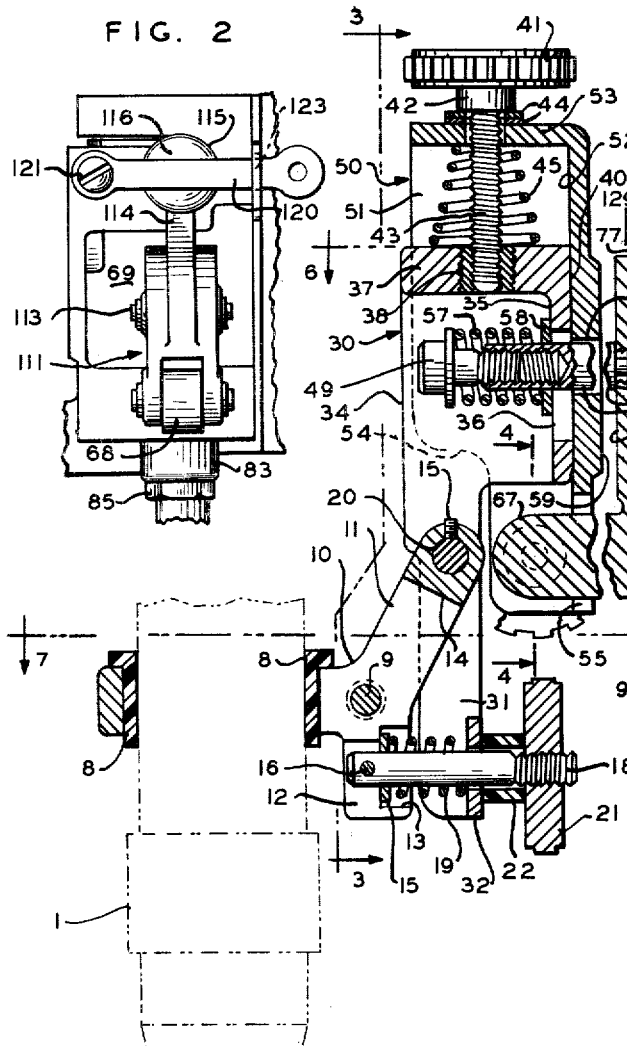

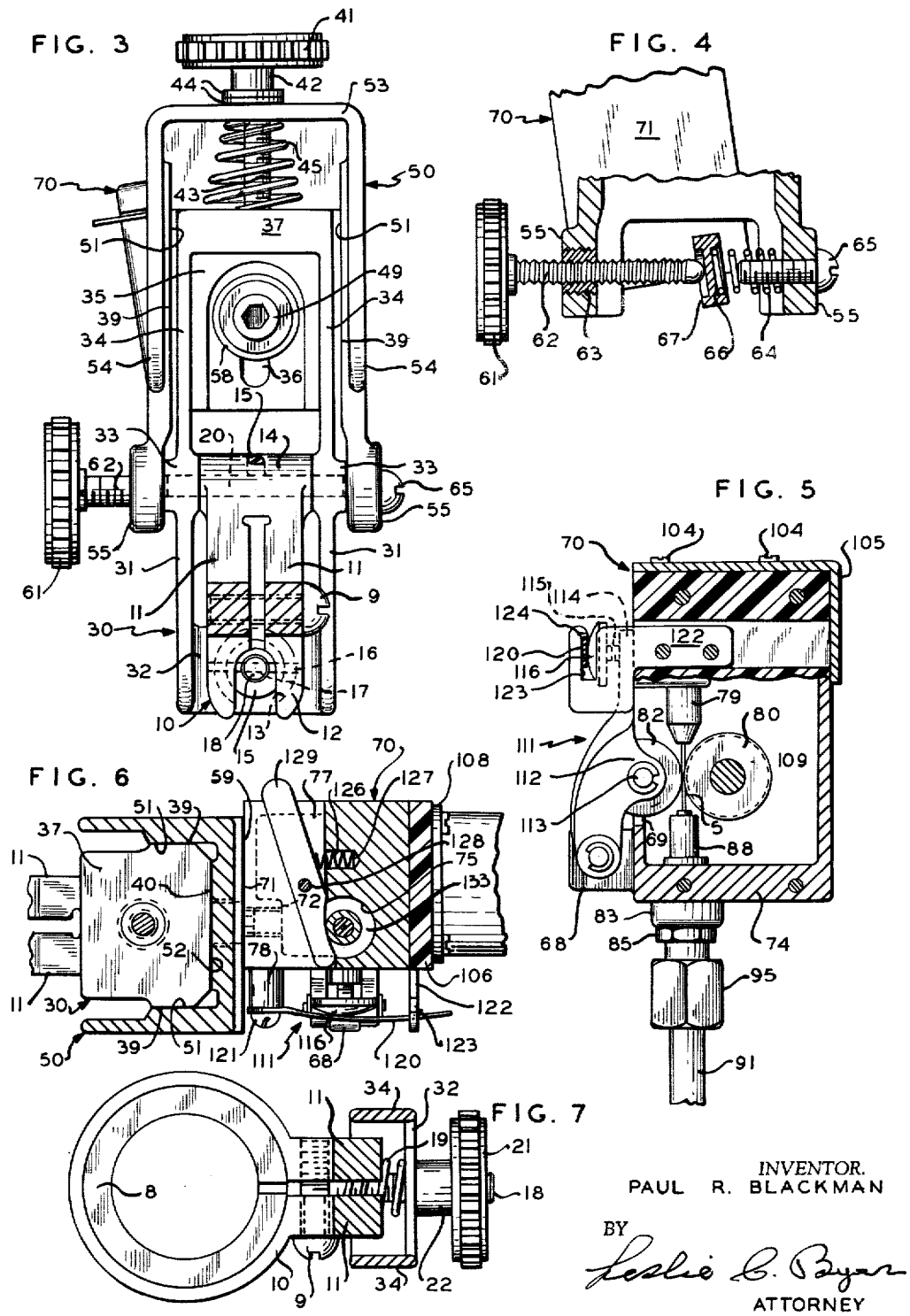

3,102,947
Patented Sept. 3, 1963

3,102,947
ARC WELDING APPARATUS
Paul R. Blackman, Cranford, N.J., assignor to Air Reduction Company, Incorporated, New York, N.Y., a corporation of New York
Filed Dec. 29, 1960, Ser. No. 87,047
12 Claims. (Cl. 219—130)

This invention relates to arc-welding systems and more particularly to improved apparatus for feeding filler wire to the weld area at a uniform or controlled rate.

Such apparatus has been broadly disclosed in U.S. Patent No. 2,681,401, issued, on application of Nelson E. Anderson, to the assignee of the present invention. As therein appears, the apparatus is conveniently associated with the electrode holders of the basic welding system. This basic system is typically of the variety in which the holder extends from an automatic welding head toward the work, and serves both to hold a non-metal-depositing electrode in suitable spaced relation to the work and to discharge therearound, and thus to blanket the weld area with, a shielding gas such as helium or argon; as brought out in that patent, however, the basic welding system may be of a simpler type by which no shielding gas is discharged, or on the other hand may be of another type in which the electrode is a metal-depositing electrode itself fed toward the work by the automatic head or equivalent thereof.

Such apparatus itself comprises in general a tubular guide terminating in an orifice adjacent the weld area; a wire-propelling means by which the filler wire is drawn off from a suitable supply and fed through the guide and orifice; and suitable controls importantly including, from the point of view of the present invention, controls over the exact position of the orifice relative to the electrode holder (to which it may be clamped) and thus—since that holder is otherwise maintained in predetermined relationship to the work extremity of the arc—to that arc extremity.

In the normal use of filler-wire-feeding apparatus of the type above dealt with the orifice is made to face, and the emerging wire is directed, at an angle (for example, 10 to 15 degrees) to the work surface, typically so that the wire will intersect that surface at approximately the leading edge of the weld "puddle" or area of molten material. In the typical case the orifice lies, with reference to the progression of the line of welding, forwardly of the electrode and it faces, insofar as orientation in directions parallel with the work surface or its tangent is concerned, rearwardly toward the weld area. It is customary to place the portion of the apparatus from which the guide extends forwardly of the electrode, this position minimizing the curvature required in the guide.

Although filler-wire-feeding apparatus such as is described in the patent mentioned above is entirely operable for its purpose, there are certain limitations on its perfection. One is that it extends relatively closely to the work for a substantial distance forwardly along the line of welding and thus interferes to a noticeable extent with visibility of and access to the work along the increments of that line which are next to be traversed. Another is that it has substantial width in a portion relatively close to the work surface, limiting the degree of permissible concavity of the work surfaces on which it is to operate. Still another is that one of the two control members or knobs by which the position of the orifice is controlled is in the portion of substantial width just mentioned, so that during welding on even a moderately concave surface access to that control member is interfered with.

It is an object of my invention to improve the visibility of and access to the work being welded by a system of the character described, especially in a forward direction from the electrode along the line of welding. It is another object substantially to increase the degree of concavity of work which may be satisfactorily welded by such a system. It is another object to render thoroughly accessible, even when welding substantially concave work, the control members or knobs by which the position of the orifice may be controlled.

A disadvantage of the structure of the above-mentioned patent is that neither of the two control members provided for conveniently controlling the position of the orifice serves to control that position in respect of the spacing of the orifice from the work extremity of the arc along the line of welding; the result is that this spacing, although not as critical as those for which the control members are provided, must be established in a rather inconvenient manner.

It is an object of my invention to provide a readily controlled adjustment—i.e., mode of movability and mechanism for moving in that mode—of the orifice position relative to the work extremity of the arc substantially along the line of welding. It is another object to provide a set of three readily controlled adjustments of the orifice position relative to the work extremity of the arc, each providing for movability in a respective one of three directions; as to which the respective directions are established for a high degree of understandability and ease of use by the operator; and the effect of each of which in its respective direction is at least reasonably free of disturbance by the subsequent calling into play of either or both of the others.

An independent disadvantage of the structure of the above-mentioned patent is that the wire-propelling means proper is located at a considerable distance from the orifice, with the result that in the feeding of the wire the length thereof which is in a state of being pushed, instead of being in the more favorable state of being pulled, is relatively substantial. It is an object of my invention to minimize the length of the filler wire which is in a state of being pushed by the wire-propelling means.

The patent abovementioned disclosed improved means for feeding wire, among others, of aluminum and other relatively soft metals. I have found, however, that under various conditions of use of those means with such metals there may still be encountered residual imperfections in the completed weld, which I have traced to the formation, by detachment from the wire in its passage through the apparatus, of "crumbs," in granular, sliver or other forms, of the wire material—some of which crumbs are flattened against and adhere intimately to the driving roller and build up raised portions thereon, causing local deformations of the wire by the roller, and others of which are ejected along with the wire from the orifice, all to the detriment of the perfection of the completed weld. It is an object of my invention to eliminate or greatly reduce the formation of such crumbs of wire material, the adhering thereof on the driving roller, the ejection thereof from the orifice and, as an allied matter, the occasional plugging up of the guide by a collection of these crumbs.

General objects of my invention are to provide an improved but economical apparatus for feeding filler wire to the weld, and to increase the degree of perfection of the weld formed with the aid of filler-wire-feeding apparatus.

Other and allied objects will appear from the following description and the appended claims.

With the foregoing objects in view, my invention comprises an arrangement of the filler-wire-feeding apparatus improved in respect of the locations and extents of its major portions; a set of adjustments for the position of the orifice each providing for movement thereof in a respective and apt direction; an organization of those adjustments improved both in respect of the nature of each and in respect of their sequence; a more advantageous location, relative to the rest of the apparatus, of the wire-propelling means proper; an organization of the apparatus especially adapted to the satisfactory use of relatively soft-metal filler wire; and other features which will hereinafter be set forth.

In the detailed description of my invention hereinafter contained reference is had to the accompanying drawing, in which:

FIGURE 1 is a vertical cross-sectional view, taken on a longitudinal plane typically containing the line of welding and normal to the work surface, through a filler-wire-feeding apparatus according to my invention, from which there has been omitted any showing of the wire supply, and in which the forward (right-shown) portion of the apparatus has been broken away from the rear portion and displaced slightly forwardly from its normal position simply to emphasize that only two elements (other than the guide) pass across the up-and-down plane at which the facing surfaces of those portions normally abut against each other;

FIGURE 1A is a fractional cross-sectional view taken along line 1A—1A of FIGURE 1;

FIGURE 2 is a fractional side elevational view (i.e., a view from a stance similar to that from which the sectional FIGURE 1 would be seen) of part of the forward portion of the apparatus;

FIGURE 3 is a vertical cross-sectional view taken along the line 3—3 of FIGURE 1;

FIG. 4 is a fractional vertical cross-sectional view taken along the line 4—4 of FIGURE 1;

FIGURE 5 is a vertical cross-sectional view taken along the line 5—5 of FIGURE 1, from which any showing of the rear portion of the apparatus (which would appear in the background) has been omitted in the interest of clarity;

FIGURE 6 is a fractional horizontal cross-sectional view taken along the line 6—6 of FIGURE 1; and FIGURE 7 is a horizontal cross-sectional view taken along the line 7—7 of FIGURE 1, from which any showing of the guide and its extremity (which would appear in the background) has been omitted in the interest of clarity.

Before detailedly describing the particular preferred embodiment of my invention which is illustrated in the drawing, it is desirable to set down certain specifications to which that embodiment responds. Obviously, in order to minimize interference with visibility of and access to the line of welding, it is desirable to concentrate the filler-wire-feeding apparatus (other than any portion or portions which it is permissible to locate remotely, such as the wire supply) over or opposite a minimum area of the work surface. Since as above noted the portion of it from which the guide extends should be disposed forwardly of the electrode holder, it becomes desirable that substantially the entire apparatus (other than permissibly remote portions) be similarly disposed—of course with as limited forward and transverse extents as possible. I have observed, however, that its extent away from and normal to the work surface is of considerably less significance, and that the really important specification as to extent in this direction is that such extent shall begin at an appreciable distance—i.e., that the entire apparatus, with the necessary exception of the guide itself, shall be spaced appreciably—away from the work surface.

With respect to the adjustments, I have found not only that it is desirable to provide them as to orifice position in three respective directions, but also that it is very helpful to ease of understanding and use by the operator if the three directions respectively be or approximate the direction along or longitudinal of the line of welding, the direction transverse of (i.e., along the work surface or its tangent at or generally at right angles to) the line of welding, and the direction normal to (or to and from) the work surface.

Since the range of desired movement in each of the three directions is relatively small, the deviation from linearity inherent in a pivotal form of adjustment will be negligible—and a pivotal adjustment has the advantages of being generally simpler and more economical to provide than is a true linear adjustment. Within apparatus located as described in the second preceding paragraph there may readily be established pivoting axes respectively appropriate to adjustment of the orifice position in directions substantially longitudinal of and transverse of the line of welding; the former should be substantially parallel with but remote from the work surface and should be relatively close to and parallel with the plane through the electrode and normal to the line of welding, while the latter should be substantially parallel with but remote from the line of welding and at least relatively close to (ideally, in) the plane through the line of welding and normal to the work surface.

A pivoting axis appropriate to adjustment of the orifice position toward and away from the work, however, would have to be positioned in or near the work surface or its tangent, in a region substantially spaced away from the electrode holder; it accordingly cannot be established within apparatus positionally confined as described in the third preceding paragraph. In accordance with my invention I utilize the relatively simpler and more economical pivotal adjustments for control of the position of the orifice in directors substantially longitudinal and transverse of the line of welding, and resort to true linear adjustment only for control of the orifice position in a direction toward and away from the work surface.

The three adjustments must of course be sequentially arranged—their sequence being conveniently considered as beginning at the part of the apparatus secured to the electrode holder—and this leads to the necessity to establish the sequence. I have observed that if the linear to-and-fro adjustment follow either of the two pivotal adjustments in the sequence, its use may appreciably disturb the orifice position considered in the direction controlled by that pivotal adjustment—and will, unless the magnitude of that use be trivial, or the setting of that pivotal adjustment be such as to cause the locus of the to-and-fro adjustment to be substantially normal to the work surface. I have further observed, however, not only that as between the longitudinal and transverse adjustments the former is noticeably the less critical but also that, as will hereinafter be more fully apparent, it is much more readily possible to limit the deviations of the to-and-fro locus from normalcy to the work surface when the to-and-fro adjustment is preceded by the longitudinal adjustment than when preceded by the transverse one. Accordingly in any preferred embodiment of my invention the linear to-and-fro adjustment will precede at least the pivotal transverse one.

In determining where the pivotal longitudinal adjustment shall be fitted into the sequence there is most compelling the desideratum (mentioned above) that its pivoting axis be inter alia relatively close (i.e., as compared with its spacing from the work surface) to the plane through the electrode normal to the line of welding (or, here more precisely stating it, relatively close to the plane through the leading edge of the weld puddle normal to the line of welding). I have observed that since the apparatus as an entirety is to extend generally forwardly from the electrode holder, that desideratum is by far most easily attained if this adjustment be made the first in the sequence. The preferred overall sequence and natures of the adjustments according to my invention are, therefore, a pivotal adjustment for longitudinal control, a linear adjustment for to-and-fro control, and finally a pivotal adjustment for transverse control, of the position of the orifice.

Reference may now conveniently be had to the drawing, and primarily to FIGURE 1 which illustrates the apparatus according to my invention in association with the electrode holder of an arc-welding system oriented to act, on a horizontal work surface (not shown) positioned slightly therebelow, along a horizontal line of welding contained in the plane of the figure. Because this orientation is a usual one, it will be assumed throughout the description of the apparatus in order to permit the convenience of using the simple terms "above," "below" etc. (rather than more, or less, remote from the work surface than, etc), but it is to be understood that no unnecessary limitations as to orientation of the apparatus and welding system as an entirety is thereby intended. (In connection with terminology it is also to be noted that the movement of apparatus and system along the line of welding need be relative only—i.e., they may actually not engage in the progressive movement, which instead may be of the work.)

In FIGURE 1 the electrode holder apears in dash-dot lines (being for simplicity not shown in section) and is designnated as 1; the electrode 2 will be seen extending downwardly from it toward the work. Forwardly of the electrode holder there will be seen the tubular wire guide 90 terminating in the tip 96; at the end of this tip is the orifice 100 (better seen in the adjacent FIGURE 1A) facing diagonally rearwardly toward the weld area, out of which the filler wire 5 emerges, and whose position relative to the electrode holder calls for accurate control.

The portion of the apparatus serving as a mounting base for the remainder is a clamp 10 (seen also in FIGURE 7 and in the bottom portion of FIGURE 3) in the form of a heavy metal ring interrupted at one point and having spaced arms 11 extending forwardly from the ring on either side of the interruption, first forwardly and then diagonally upwardly. The ring portion of the clamp is preferably lined with a flanged and split cylinder 8 of insulating material, and the thus-lined clamp may be firmly secured about the electrode holder 1 by tightening the two arms 11 together near the ring portion as by screw 9. Below that screw each of these arms may be provided with a short downward extension 12, and a single cylindrical bore 13 may be made rearwardly for a limited distance into these extensions as a pair, for a purpose hereinafter referred to. At their upper forward extremities the arms 11 may merge into a single transverse hub 14 which extends slightly beyond each arm, lengthwise through and beyond which may extend a pivoting shaft 20 secured in place in the hub as by set screw 15.

The pivoting shaft 20 forms the pivoting axis of the longitudinal adjustment of the position of the orifice relative to the electrode holder. It was noted above that this axis should be relatively close to the plane through the electrode normal to the line of welding; in order to maximize compliance with that specification within the limitations imposed by the configuration of the basic welding system itself, the forward extent of the arms 11 should be as restricted as is possible while still allowing some rockability, about the shaft 20, of the next portion of the apparatus, now to be described.

That next portion is a first frame 30 (seen also in FIGURES 3 and 6) which in its lower part comprises two generally vertical arms 31 having a substantial transverse separation; these arms extend, as arms, for a considerable distance below the hub 14 and carry, between their forward lower regions, a cross-member 32. Opposite the hub 14 each arm 31 may have the transversely thickened portion 33, the pair of portions 33 just straddling the length of the hub; the entire frame 30 is journalled to the hub by passage through the thickened arm portions 33 of the end portions of the shaft 20.

The arms 31 extend, as arms, a short distance upwardly from the shaft 20 and then merge into frame sides 34 which are of substantially greater forward extent than the arms. Between tops of the frame sides 34 there extends the relatively thick frame top 37; between the forward portions of the frame sides 34 there extends the permissibly thinner frame front 35, of which the forward surface 40 is machined to a smooth plane state. Near their forward limits the frame sides 3 are externally thickened and externally machined to provide smooth plane surfaces 39.

The annular position of the first frame 30 about the shaft 20 may be controlled within suitable limits by mechanism associated with its cross-member 32 and the downward extensions 12 of the clamp 10. Thus between those downward extensions there may pass the transverse pin 16 which, between the extensions, may pass freely through a transverse hole 17 provided in, and may thus support the rear end of, a stud 18. From this pin the stud may extend forwardly, axially of the bore 13, and may pass freely through a suitable hole in the cross-member 32. Between that cross-member and the rear end of bore 13 the stud 18 may be encircled by a compressed helical spring 19, the rear end of which may bear against the rear end of the bore through a suitable washer 15 and the forward end of which may bear directly against the cross-member 32; the spring 19 biases the entire first frame 30 to counterclockwise rotation about shaft 20, as seen in FIGURE 1. A controllable limit to this rotation may be provided by a centrally threaded knob 21 screwed on the forward end portion of the stud 18 (which is threaded for the purpose), against the rear surface of which knob the cross-member 32 may bear through the collar 22 encircling the stud 18 between cross-member and knob.

The forward surface 40 of the frame front and the side surfaces 39 collectively form a track (i.e., of "monorail" variety) for linear movement of the portions of the apparatus yet to be described; this track is generally normal to the work surface, and thus is appropriate to the linear to-and-fro (i.e., to and from the work) adjustment of the position of the orifice. Stated in other terms, 40—39—39 constitute a set of surfaces which guide and along which may move the interior surfaces of the next portion of the apparatus, now to be described.

That next portion is a second frame 50 (seen also in FIGURES 3 and 6) which is in general a vertically disposed channel embracing, from the front, the upper portion of the first frame 30; its central (or front) section may be provided with a smooth plane interior surface 52 slidable in intimate contact along the surface 40, and its side sections may be provided with smooth plane interior surfaces 51 slidable in substantial contact with the respective surfaces 39. In its upper part the second frame 50 may be provided with a solid top 53; the lower parts of its sides may be somewhat restricted in rearward extent, as indicated at 54, and the central part of its central section may be restricted in downward extent as indicated at 55. The vertically central portion of its central section may be forwardly somewhat thickened and provided with a smooth plane exterior surface 59.

The second frame 50 is positively held so that its interior surface 52 is in intimate contact with the surface 40 of the first frame. To provide for this holding there may pass rearwardly through a generally central hole 56 in the central section of the second frame a generally horizontal stud 60 which—by an arrangement of parts hereinafter described—is restrained against rearward movement with respect to the second frame; this stud may pass through a vertically elongated hole 36 in the front 35 of the first frame and may extend for a substantial distance rearwardly therefrom. In its rear portion the stud is internally threaded, and into seated position in this threading there may be screwed from the rear a flanged screw 49. Around the screw and stud between the flange of the screw and the first-frame front 35 there may be compressed a helical spring 57, bearing at the rear directly against the flange and at the front against the first-frame front 35 through the washer 58; the spring biases rearwardly, with respect to the first frame 30, the flange of screw 49 and thus the entire second frame 50.

The vertical position of the second frame 50 relative to that of the first frame 30 may be controlled, within the limits imposed by the elongated hole 36, by mechanism associated with the tops of the two frames. This mechanism may comprise a conically helical spring 45 compressed between the tops whereby to bias the second frame upwardly with respect to the first, and means for controllably limiting the response of the second frame to that bias. Such means may be a screw 43, whose head is a large-diameter knob 41 with medium-diameter spacing extension 42 thereof immediately therebelow, passing freely through a hole in the second-frame top and between the tops axially of the spring 45, and threaded into the first-frame top 37—desirably, into a hardened threaded bushing 38 which has first been screwed into and become a part of that top. Desirably one or more washers 44 surround the screw between the knob extension 42 and the top 53 to preclude wear on the latter.

The stud 60 forms the pivoting axis of the transverse adjustment of the position of the orifice relative to the electrode holder, the stud 60 being so arranged that the pivoting axis defined thereby is disposed parallel to the line of welding. This it does in addition to its function above described; still further, it performs the function of a sole means for assembling to the second frame the next portion of the apparatus, now to be described.

That next portion is a housing 70 (seen also in each of FIGURES 3 through 6). It may be provided with a rear surface 71 which, excepting in its bottom part, is machined to a smooth plane state; this rear surface 71 is thus adapted to lie in intimate contact with the forward surface 59 of the second frame 50. Surface 71 is held in such contact by the stud 60, which in its forward portion is formed with a shoulder 60' forward of which it has a reduced-diameter threaded portion 60"; the latter is screwed into the housing (a suitable internal boss 72 being provided in the housing to accommodate 60") until the shoulder 60' rests against the surface 71. It will be recognized that the housing 70 thus becomes the means, mentioned above, restraining the stud 50 against rearward movement; on the other hand the rearward bias of the stud by spring 57 biases the housing into contact of its surface 71 with the second-frame surface 59.

It is seen, in summary, that the described arrangement of my structure thus provides in the intended way: a first axis defined by the shaft 20, about which the outlying frame top part 37 moves for the longitudinal adjustment as aforesaid; a track surface defined by the track 40, 39, 39 along which the outlying frame part 50 moves for to and fro adjustment as aforesaid; and a second axis defined by the stud 60, about which the housing part 70 moves for the transverse adjustment aforesaid.

The housing 70 may be considered as a five-sided enclosure basically open only at the front (and there actually covered by elements later described); it may have the very thick top 73 and a moderately thick bottom 74. Whereas the portions of the apparatus hereinabove described may be transversely centered on the plane along which FIGURE 1 is taken, the housing 70 may be located principally on the far side (as seen in FIGURE 1) of that plane—the boss 72 being accordingly (as seen in dotted lines in FIGURE 6) relatively close to and merging into the near side of the housing.

The angular position of the housing 70 about the stud 60 may be controlled within suitable limits by mechanism associated with its lower rear portion and with the two lower side portions of the second frame 50. Thus rearwardly from the rear surface of the housing at the bottom, preferably vertically below the stud 60, there may extend the lug 67. Through one of the second-frame lower side portions there may be screwed inwardly the transverse screws 65, of length sufficient so that it extends inwardly there-beyond. About the inner end of this screw and extending to a slight well 66 in the lug 67 may be a compressed helical spring 64; this spring of course biases the housing 70 to counterclockwise rotation about the stud 60 (as viewed from the front). A controllable limit to this rotation may be provided by a screw 62, whose head is a large-diameter knob 61, threaded inwardly through the other of the second-frame lower side portions in alignment with the screw 65 so that its inner end is impinged on by and forms a stop for the lug 67. Desirably the screw 62 is threaded through a hardened threaded bushing 63 which has first been screwed into and forms a part of the frame portion.

The housing 70 is the part of the structure now described from which there extends downwardly and rearwardly the tubular guide 90. To provide for the attachment of this guide the bottom 74 of the housing may have a slightly downwardly extending boss 83, preferably in the same longitudinal vertical plane (i.e., that of FIGURE 1) as the stud 60, the bottom of which is machined, and centrally through this boss may be provided a tapped hole. Upwardly into this hole may be screwed a cylindrical adapter 84, until a flange 85 formed on the adapter abuts against the bottom of the boss. The bottom or outer end portion of the adapter may be externally threaded, and in is bottom surface there may be formed the transverse slot or key-way 86.

The guide 90 has an external casing 91 of which the upper end portion terminates its full-diameter extent in a flange 93 from which there extends upwardly a key 94 adapted to fit into the slot 86. The flange 93 may be held against the bottom of the adapter as by the clamping nut 95 screwed onto the threaded lower end portion of the adapter, under which condition a reduced-diameter portion 92 of the casing 91 extends up into the adapter for a short distance. The casing 91, which may for example be of hard-drawn copper tubing, may extend first downwardly and then curve rearwardly to an extremity relatively near the lower end of the electrode holder; there it may be provided with external threading, and onto that threading may be screwed the internally threaded inner end portion of tip 96, in the outer end portion of which is provided the orifice 100.

It will be apparent that the position of the orifice 100 may be controlled in the longitudinal direction by the knob 21, which rocks the two frames (30 and 50) and the housing (70) about shaft 20; that it may be controlled in the to-and-fro (as illustrated, vertically) direction by the knob 41, which moves the second frame and the housing in that direction; and that it may be controlled in the transverse direction by the knob 61, which rocks the housing about the stud 60. These are three directions instinctively understood by the operator and thus most easily worked with by him to proper advantage. Use of the longitudinal adjustment does not appreciably affect the position of the orifice in either the to-and-fro or transverse directions, and likewise use of the transverse adjustment does not affect that position in either the longitudinal or to-and-fro directions—while use of the to-and-fro adjustments does not affect that position in the transverse direction, and can affect it in the longitudinal direction only to a degree determined by the deviation of the locus of to-and-fro movement from normal to the work surface. The guide 90 will be initially configured to result in normalcy of that locus to that surface under average conditions, and deviations from such normalcy will therefore be trivial in magnitude and effect; this is particularly true since by reason of its nature and configuration the guide 90 is fairly proof against change of that configuration by accidental blows or large pressures on its tip in a longitudinal direction. (It is less proof against such blows or pressures in a transverse direction, since the torsional mode of yielding of its upper portion is then additionally available, and furthermore the discernment of its having yielded in that direction cannot so readily be depended on; such a yielding, however, will simply be compensated for by use of the transverse adjustment, with no disturbance of the substantial normalcy of the to-and-fro locus to the work surface—which would not be the case were the to-and-fro adjustment preceded by the transverse adjustment in the sequence.)

The entire structure (that is, the apparatus as above described with the exception of the guide 90) is located upwardly of a point which is little below the clamp 10, and is at the same time of very restricted transverse dimension; thus there are provided a high degree of visibility of and access to the work and excellent adaptation to use on quite concave work—with full accessibility to the knobs even when the work is concave.

Before describing the wire-propelling means it will be convenient first to complete the description of the path of the wire 5 through the apparatus. The wire 5 may enter the housing 70 from above, through a flexible metallic tube 130 leading from the supply reel (not shown, and which may be hung in any convenient nearby location). The patent mentioned above taught the lining of the metal tubing through which the wire was propelled with insulating material, and in the preferred embodiments of my invention I also employ a non-metallic and thus insulating, lining (although, as will be later apparent, I employ it as a part of a combination of elements, and for a particular function, not disclosed in that patent). Accordingly in FIGURE 1 the tube 130 will be seen to be lined with an insulating liner 131; this may be taken as typical of an insulation of the wire from contact with any other metal in the course of its unreeling and passage to the illustrated extremity of the tube 130. At this extremity the tube may be enlarged and fastened around the upper portion of a generally cylindrical coupling 132, part-way into which the liner 131 extends; the coupling may be provided with its own insulating liner 134 for the balance of its length.

The end of the coupling 132 may be inserted downwardly into a suitable bore 75, which is axially aligned with the adapter 84, in the housing top 73 and may be secured in inserted position by the forward end of a lever 129 engaging a circumferential slot 133 provided for the purpose near the insertible end of the coupling. As appears in FIGURES 1 and 6, this lever may be located in a horizontal slot 77 formed forwardly from the rear in the housing top 73 and intersecting the bore 75; it may be pivoted on a pin 128 vertically traversing the slot, and its forward portion may be biased into the bore 75 by a small spring 126 compressed between the rear portion of the lever and the inner end of a small well 127 extending forwardly from the slot 77. A suitable bevel at the insertible extremity of the coupling may serve, in the act of inserting the coupling, to cam the lever 129 out of the bore 75 until the lever can enter the circumferential slot; when it is desired to remove the coupling the other end of the lever, which projects beyond the housing, may be manually moved against the bias to swing the forward end of the lever out of that slot.

The bore 75 may be terminated before having traversed the entire top 73 of the housing, but its central portion may be continued downwardly through the remainder of that top thickness, which may in this area be somewhat increased as indicated at 73′, in the form of the more restricted and coaxial bore 76. Extending downwardly through and somewhat beyond this restricted bore, and having an enlarged head or flange which rests on the shoulder formed between the bores, is a bushing 79 of non-metallic material which is axially apertured freely to pass the wire to within the housing.

In leaving the housing the wire may enter a non-metallic lining tube 89 whose upper portion is axially held within the adapter 84. This tube 89 may be thus held by a metallic tube 88 which extends, from somewhat above the upper end of the adapter, into the adapter to abut against the upper end of the reduced-diameter portion 92 of the guide casing 91; the upper end portion of the tube 88 may be of smaller internal diameter than the remainder and internally threaded, and it will have been screwed over the threaded upper end portion of the lining tube 89. The lining tube 89 may extend from slightly above the top of the tube 88 through the guide casing 91, whose bore it freely fits, to terminate within the guide tip 96. That guide tip is formed within two sections comprising a metallic body section 97 screwed over the outer end of the guide casing 91, and a metallic tube section 98 held within the outer portion of the body section and extending forwardly therefrom; the lining tube 89 terminates at a point near the tube section 98.

The rest of the path of the wire—i.e., the interior of the tube section 98—should, by reason of considerations of wear and the like, also be lined as by the liner 99 seen in FIGURES 1 and 1A, the outer end of which extends at least to the end of the tube section 98 and preferably slightly therebeyond. In this connection it is to be noted that insulation of the wire from the electrode holder—taught by the patent abovementioned to be desirable in order to preclude unwanted arcing from the electrode to the wire—is already provided in the present apparatus by the cylinder 8 of insulating material which lines the clamp 10; thus it is not broadly indispensible to form the lining sleeve 99 of insulating material, and I have found it convenient when the apparatus is to be used to feed wire of relatively harder material (such as steel) that the lining sleeve 99 be of nickel or other wear-resistant metal.

But when the apparatus is to be used to feed wire of relatively softer material (such as aluminum) I have found—for reasons developed hereinafter—that the lining sleeve 99 should be of non-metallic, and thus insulating, material. On the other hand whatever its material be, that material must not only be interiorly smooth-surfaced but must also be highly heat-resistant, in view of its operating proximity to the intense heat of the welding zone. I have found satisfactory for the purpose a lining sleeve of a tetrafluoroethylene resin compound (such as sold under the trademark "Teflon"). For a structure in which there is provided insulation of the wire from the entire guide it is to be noted that the illustrated one, in which the tip is in heat-conducting relationship to the entire guide 91 (and therethrough to the other metallic sections of the apparatus), is a much more favorable one than the structure of the patent above-mentioned, in which the tip, though metallic, is thermally insulated from other elements and therefore during use becomes and thereafter for a considerable time remains extremely hot and thus presents a burn hazard.

It may be noted that the apparatus may readily be adapted to the use of substantially different-diameter filler wires by exchange of the flexible tube 130 (with its lining), the bushing 79, the lining tube 89 (with attached tube 88) and the lining sleeve 99, for ones of different internal diameters; the simple resting in place of the bushing 79 and of the tubes 89—88 is a substantial facilitation to such interchange.

Attention may now be directed to the wire-propelling means proper, which is to be seen illustrated in FIGURES 1, 5 and 6. Because the housing is spaced a substantial distance from the work, and because the transverse dimension required by the wire-propelling means is small, I assemble that means within and to the housing; this minimizes to the practical limit—essentially only the length of the guide 90—the length of the wire which is in a state of being pushed.

The part of the wire-propelling means which is in immediate association with the wire is a pair of rollers. Thus between the levels of the lower extremity of the bushing 79 and of the upper extremity of the lining tube 89 the wire may pass in contact with the periphery of a driving roller 80 which is disposed within the housing and whose axis may extend in a front-and-back direction and may lie for example at the transverse center of the housing 70; this driving roller may be secured on the rearwardly extending shaft 109 of a driving motor 110 hereinafter further mentioned. The wire may be pressed against and thus into driven relationship with the driving roller 80 by a pressure roller 82 (see FIGURE 5) which is normally disposed in an opening 69 in the side of the housing 70 (i.e., in the side from which the showing of FIGURE 1 is taken) and which is freely journalled on a support 111 hereinafter described. It may be mentioned that it is desirable, in order to minimize the unconfined length of the wire between bushing 79 and the lining tube 89, that those two elements extend as far toward each other as the rollers 80 and 82 conveniently permit.

The motor 110 (of which only the rear portion is seen in the drawing) may be an axially long and diametrically restricted one, provided near its rearwardly directed shaft end with a mounting flange 108. The motor may be mounted by fastening of this flange to the front of a suitably apertured vertical mounting plate 106 of insulating material, which in turn is fastened across the originally open front of the housing 70; the principal part of the motor will lie forwardly of the mounting plate 106, the portions thereof extending to the rear of that plate being limited for example to a small gear-housing 107 (in which suitable speed-adjusting gears may be contained) and the shaft 209 on which the driving roller 80 is secured. About the main portion of the motor may be provided a casing 105, whose rear peripheral portion may be fastened as by screws 104 to the forward peripheral portion of the housing 70, and which may therefore be considered as forming a forward extension of that housing.

The pressure-roller support 111 (seen in FIGURES 2, 5 and 6) may be a vertical lever or arm bifurcated in its lower portion and there pivoted, along a front-and-back axis, on a lug 68 extending outwardly from the side of the housing 70 underneath the opening 69 therein. From the vertical mid-portion of the arm 111 there may extend inwardly through the opening 69 two parallel projections 112 (the forward one only of which is seen in FIGURE 5) between which the pressure roller 82 may be journalled for free rotation on a front-and-back shaft 113 extending between the projections. The arm 111 may have a single upper portion 114; adjustably screwed through this portion along a transverse axis may be a screw 115 outwardly terminating in a relatively large oval head 116. Against this head and thus against the arm 111 there may be applied an inward biasing force which will cause the pressure roller 82 to press the wire against and thus into driven relationship with the driving roller 80.

To apply this bias there may be employed a spring arm 120 of which the rear end portion is pivoted on a transverse shoulder screw 121 screwed into the end of a lug 78 extending transversely outwardly from the top housing portion 73. This spring arm 120, assuming it first to be in an orientation extending upwardly from the shoulder screw, may be swung clockwise (as viewed in FIGURE 2) about that screw into the illustrated horizontal position—an intermediate forward portion of the spring arm passing, during the last portion of such swing, into a vertical retaining slot 123 formed in a horizontal-L-shaped plate 122 secured to and extending transversely outwardly from the front surface of the housing top 73 (to accommodate which plate the rear surface of the motor-mounting plate 106 is suitably grooved). During the last part of such swing an intermediate rear portion of the spring arm will impinge upon the screw-head 116 and will be cammed outwardly by the oval configuration of the latter; at the conclusion of such swing—the intermediate forward portion of the spring arm then being fully inserted into the slot 123— the intermediate rear portion of the spring arm will be centered vertically with respect to the screw-head and will thereby be bowed outwardly, as indicated in FIGURE 6. It is the force developed in the spring arm by this bowing thereof which is applied against the screw-head 116 to effect the biasing described above. Dependably to retain the spring arm 120 in fully inserted position in the slot 123, the upper portion of the slot, just above the fully inserted position of the spring arm, may be provided with a slight constriction 124 which will lie in the path of any possible upward "creeping" within the slot which the spring arm might otherwise attempt.

It will be understood that when access is desired to the inside of the housing 70—as for purposes of threading a new wire 5 in place in the apparatus, changing the bushing 79 etc.—the spring arm may be removed from the slot 123 and rotated out of contact with the screw-head 116 and the arm 111 then rocked outwardly and downwardly about its pivot, thereby uncovering the opening 69 in the side ofthe housing through which such access may then be had.

The wire-propelling means proper as above described is itself known, for example in arc-welding systems of the metal-depositing-electrode type shown in U.S. Patent No. 2,504,868 issued, on application of Albert Muller et al., to the assignee of the present invention. With respect to the driving and pressure rollers in such known wire-propelling means, it has been customary to make them and their peripheral portions of metal and to form in the periphery of at least the pressure roller a circumferential groove into which a portion of the cross-section of the wire may fit at the point of tangency of wire with roller, thereby uniquely establishing the position of the wire in the direction of the roller axis. It has also been customary when feeding wires of relatively harder material to knurl at least one of the rollers—a common combination being a knurled but ungrooved driving roller and an unknurled but grooved pressure roller. The use of any such combinations of rollers and surfaces thereof, as conditions may require, is contemplated by my invention.

My invention also particularly contemplates a special combination of rollers and surfaces thereof, along with other aspects of the apparatus, for use with wire of relatively softer material such for example as aluminum. It was brought out early hereinabove that in the feeding of such wire there is a strong tendency to the formation, by detachment from the wire in its passage through the apparatus, of crumbs of the wire material which, as there brought out, have several direct and indirect unfavorable effects on the perfection of the weld and moreover may occasionally plug up the guide. I have found that the formation of these crumbs of wire material and all the deleterious effects thereof may be substantially wholly foreclosed and obviated by maintaining the wire, in its passage through the apparatus, altogether free of any contact with metallic elements relative to the surfaces of which the wire moves or is constrained to move.

Freedom of contact with stationary elements of metal has of course been provided for by the liners 131 and 134, the bushing 79, the lining tube 89 and the lining sleeve 99—and the remaining elements which the wire contacts in its passage are only the rollers 80 and 82. The peripheral portion of the pressure roller 82, since it is neither a stationary nor a driving element—i.e., since in view of the free journalling of the roller its surface is free to and does move with the wire—may therefore still be of metal (and of course preferably not knurled), though its formation of insulating material is permissible. But the peripheral portion of the driving roller 80, relative to the surface of which the wire is constrained to slip by the frictional drag exerted on the wire along its path, is in accordance with my invention made of non-metallic, or insulating, material such for example as a fabric-filled phenolic compound (and also is preferably not knurled); this specification for the driving roller I have found effective both in minimizing the original formation of the crumbs and in the resulting rejection by the roller surface of any adherence or build-up of any occasional crumb which might residually be formed.

To increase the degree of contact of the wire with the driving roller 80 the periphery of that roller is provided with a circumferential groove 81—of V or similar cross-section which will result in two circumferential lines (rather than only one) along which the wire contact will be progressively established. The driving roller being grooved and the position of the wire axially of the rollers thus uniquely established, it is unnecessary (though permissible) to groove the pressure roller as well.

While I have disclosed my invention in terms of a particular embodiment thereof, I intend no unnecessary limitations thereby. Modifications in many respects will be suggested by my disclosure to those skilled in the art, and such modifications will not necessarily constitute departures from the spirit of the invention or from its scope, which I undertake to define in the claims set forth below.

I claim:

1. In an arc-welding system including an electrode holder movable relative to a work surface along a desired line of welding thereon and an orifice adjacent the welding zone out of which may be fed wire to be consumed in the welding: the combination of a structure comprising a first frame supported by the electrode holder, a second frame supported by the first frame, means on one of said frames forming a track generally normal to the work surface guiding and along which may be effected movement of the second frame relative to the first, and a member pivotally assembled to the second frame along an axis substantially parallel with the line of welding; and a wire-guide extending from said member to adjacent the welding zone and there provided with said orifice.

2. In an arc-welding system including an electrode holder movable, relative to a work surface, forwardly along a desired line of welding thereon and an orifice adjacent the welding zone out of which may be fed wire to be consumed in the welding: the combination of a structure comprising a first frame supported by the electrode holder, a second frame supported by the first frame, means on one of said frames forming a track generally normal to the work surface guiding and along which which may be effected movement of the second frame relative to the first, and a member pivotally assembled to the second frame along an axis substantially parallel with the line of welding, said structure extending generally forwardly from the electrode holder and being substantially spaced away from the work surface; and a wire-guide extending from said member to adjacent the welding zone and there provided with said orifice.

3. The subject matter claimed in claim 6 wherein said structure further includes a member secured to the electrode holder and to which said first frame is pivotally assembled along an axis substantially parallel with the work surface and transverse of the line of welding.

4. The subject matter claimed in claim 1 further including means for propelling the wire through said guide to the orifice, and wherein said member is a housing for said wire-propelling means.

5. The subject matter claimed in claim 1 wherein said second frame is held in supported relation to said first frame by a means also providing the axis for the pivotal assembly of said member to said second frame.

6. In an arc-welding system including an orifice positionable near the welding zone and out of which may be fed wire to be consumed in the welding: the combination of a tubular metallic wire guide extending to adjacent the welding zone and there terminating in a metallic tip in thermally conductive relationship to the remainder of the guide, a tube of flexible non-metallic material within said guide terminating within a portion of said tip, and being in the form of a lining tube, which lining tube is elongated in construction and which lining tube, for at least a major portion of the length of the metallic wire guide thereabout, is coextensive in length with said wire guide, and a sleeve of heat-resistant non-metallic material within a remaining portion of and extending at least to the outer extremity of said tip, said orifice being formed by the outer extremity of said sleeve.

7. In an arc-welding system including an electrode, a holder therefor moveable relative to a work surface along a desired line of welding thereon, and an orifice near the electrode out of which may be fed wire to be consumed in the welding: positioning mechanism for the orifice comprising a structure having a base part secured to the electrode holder; and a guide in which the orifice is provided extending from an outer part of the structure; said structure having respective means providing respective first and second pivoting axes; said structure further having means providing a track; there being outlying portions of said structure each occupying, with respect to a different one of said axes and said track provided as aforesaid, a position outlying therefrom; the first of which axes being arranged substantially parallel with but remote from the work surface, and relatively close to and parallel with the plane through the electrode and normal to the line of welding, the second of which axes being arranged substantially parallel with but remote from the line of welding and at least relatively close to the plane through the line of welding and normal to the work surface, and about each of which axes the therefrom-outlying portion of said structure may be angularly moved within restricted limits; said track presenting track surfaces which have a disposition generally normal to the work surface, and along which the therefrom-outlying portion of said structure may be moved; said three mentioned means being arranged between said base and outer parts in an outwardly directed sequence in which the means providing said track precedes the means providing said pivoting axis substantially parallel with the line of welding.

8. The subject matter claimed in claim 7, and further comprising wire-propelling means carried by said outlying portion of said structure which occupies said position outlying from the aforesaid first means providing said pivoting axis.

9. In an arc-welding system including an electrode holder moveable, relative to the work surface, forwardly along a desired line of welding thereon, and an orifice adjacent the welding zone out of which may be fed wire to be consumed in the welding: the combination of a structure secured to the electrode holder and extending generally forwardly therefrom in spaced relation to the work surface; means for conducting the wire to said structure; a wire-guide extending from said structure to a point adjacent the welding zone and there provided with said orifice; means comprised in said structure providing for control of the position of said orifice relative to the electrode holder in a plurality of directions; means in said structure for propelling the wire through said conducting means and said guide; and means in said conducting means and said guide defining passages for the wire to the propelling means and from the propelling means to said orifice; there being wire contacting surfaces of a non-metallic material presented by said propelling and passage defining means and operatively arranged to provide support and confinement to said wire, with the wire through said passages and said propelling means being free of contact with driving or stationary surfaces of metal.

10. In an arc-welding system including an orifice positionable near the welding zone and out of which may be fed wire to be consumed in the welding: the combination of propelling means through which the wire passes to be fed thereby; and means defining passages for the wire to the propelling means and from the propelling means to the orifice; there being wire contacting surfaces of a non-metallic material presented by said propelling and passage defining means and operatively arranged to provide support and confinement to said wire, with the wire through said passages and said propelling means being free of contact with driving or stationary surfaces of metal.

11. In an arc-welding system including an orific positionable near the welding zone and out of which may be fed wire to be consumed in the welding; the combination of propelling means through which the wire passes to be fed thereby, said propelling means comprising a driving roller adjacent the periphery of which the wire extends, and a freely journalled roller whose periphery biases the wire against the periphery of the driving roller; and means defining passages for the wire to the propelling means and from the propelling means to the orifice; there being wire contacting surfaces of a non-metallic material presented by said passage and driving roller and operatively arranged to provide support and confinement to said wire, with the wire through said passages and in its contact with the driving roller being free of contact with metal.

12. In an arc-welding system including an electrode, a holder therefor moveable relative to a work surface along a desired line of welding thereon, and an orifice near the electrode out of which may be fed wire to be consumed in the welding: positioning mechanism for the orifice, comprising a structure having a clamp part secured to the electrode holder; and a guide in which the orifice is provided extending from the structure; said structure having a number of respective means providing that number of respective pivoting axes; said structure further having means providing a track; there being portions of said structure each occupying, with respect to a different one of said axes and said track, a position outlying therefrom; the aforesaid number of respective pivoting axes having an arrangement which affords respective limited movements of the orifice in a direction substantially longitudinally of, and in a direction substantially transversely of, the line of welding; said track presenting track surfaces which have a disposition generally normal to the work surface along which the therefrom-outlying portion of said structure may be moved; said aforementioned means being arranged between said clamp port and outlying portions in an outwardly directed sequence in which the means providing said track precedes at least one of the means providing a pivoting axis as aforesaid affording limited movement of said orifice in at least one of the directions named; substantially the entirety of said structure lying farther from the work surface than said clamp part.

References Cited in the file of this patent

UNITED STATES PATENTS

| | | |
|---|---|---|
| 2,644,070 | Herbst | June 30, 1953 |
| 2,681,401 | Anderson | June 15, 1954 |
| 2,731,536 | Laur | Jan. 17, 1956 |
| 2,736,787 | Welch | Feb. 28, 1956 |
| 2,982,845 | Yenni | May 2, 1961 |
| 3,009,619 | Layden | Nov. 21, 1961 |

UNITED STATES PATENT OFFICE
CERTIFICATE OF CORRECTION

Patent No. 3,102,947                           September 3, 1963

Paul R. Blackman

It is hereby certified that error appears in the above numbered patent requiring correction and that the said Letters Patent should read as corrected below.

Column 1, line 16, for "holders" read -- holder --; column 4, line 32, for "directors" read -- directions --; column 5, line 20, for "apears" read -- appears --; line 22, for "designnated" read -- designated --; column 6, line 5, for "3" read -- 34 --; column 8, line 29, for "is" read -- its --; column 13, line 47, strike out "which"; column 13, line 55, for the claim reference numeral "6" read -- 1 --; column 15, line 19, for "passage" read -- passages --.

Signed and sealed this 14th day of April 1964.

(SEAL)
Attest:

ERNEST W. SWIDER                                      EDWARD J. BRENNER

Attesting Officer                                            Commissioner of Patents